No. 780,457. PATENTED JAN. 17, 1905.
E. L. THOMAS.
TIRE FASTENER.
APPLICATION FILED MAY 23, 1904.
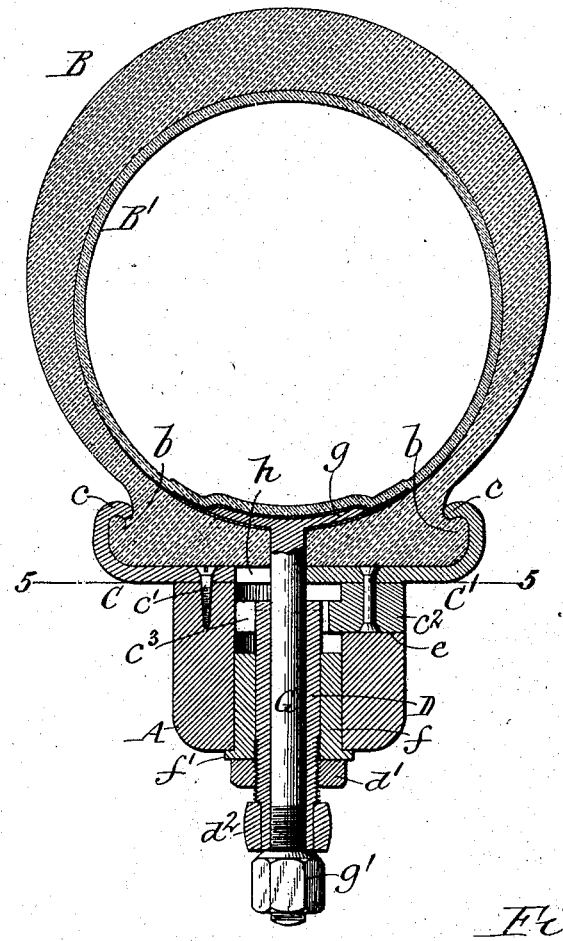
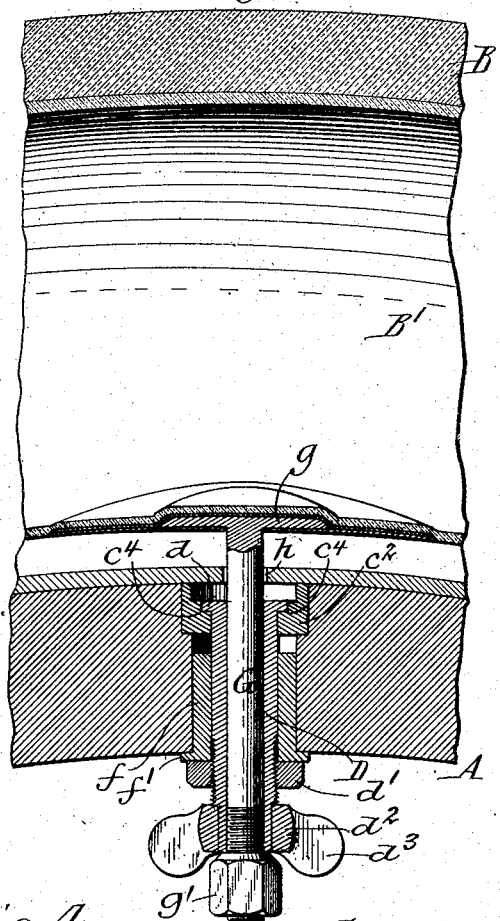
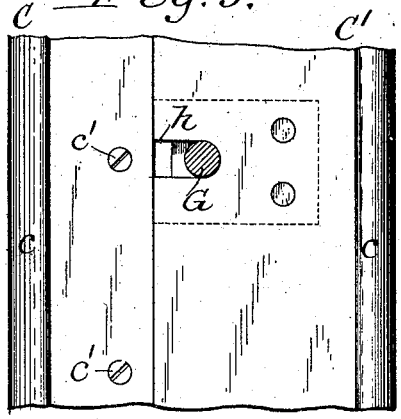
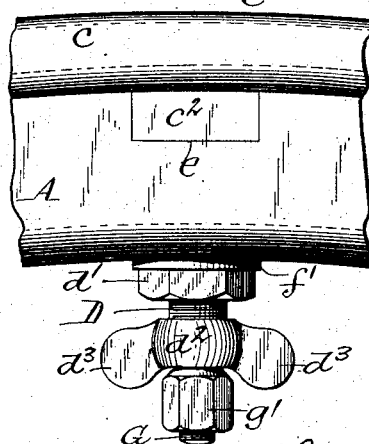
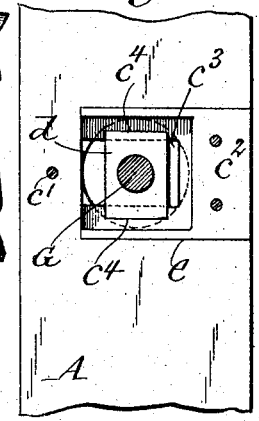
Witnesses: Edwin L. Thomas, Inventor
Louis W. Gratz.
Robert Weitknecht. By Geyer & Popp Attorneys.

No. 780,457.

Patented January 17, 1905.

UNITED STATES PATENT OFFICE.

EDWIN L. THOMAS, OF BUFFALO, NEW YORK.

TIRE-FASTENER.

SPECIFICATION forming part of Letters Patent No. 780,457, dated January 17, 1905.

Application filed May 23, 1904. Serial No. 209,155.

*To all whom it may concern:*

Be it known that I, EDWIN L. THOMAS, a citizen of the United States, residing at Buffalo, in the county of Erie and State of New York, have invented new and useful Improvements in Tire-Fasteners, of which the following is a specification.

This invention relates to the fastenings employed for detachably securing tires to wheel-rims, and more particularly to the class of fasteners comprising a pair of opposing rings provided at their outer edges with lips or flanges which embrace outwardly-projecting flanges on the base of the tire.

The object of my invention is to provide a simple and secure fastening of this character which permits the ready application and detachment of the tire.

In the accompanying drawings, Figure 1 is a transverse section of the rim portion of an automobile-wheel embodying my invention. Fig. 2 is a fragmentary longitudinal section thereof. Fig. 3 is a fragmentary face view of the tire-retainer, showing one of the auxiliary bolts in cross-section. Fig. 4 is a fragmentary side elevation of the wheel-rim and the tire-retainer. Fig. 5 is a longitudinal section in line 5 5, Fig. 1.

Similar letters of reference indicate corresponding parts throughout the several views.

A indicates the wheel-rim, which in the construction shown in the drawings is of wood, but which may be of metal, if desired. The tire may be either of the cushion or the pneumatic type, that shown in the drawings being a pneumatic double-tube tire designed more especially for automobiles. The outer tube or casing B of the tire has the usual longitudinal slit on its inner side for the insertion of the inner tube B' and is provided with outwardly-projecting base-flanges $b$, adapted to interlock with the retainer by which it is secured to the wheel-rim. This retainer consists of two opposing rings or bands C C', surrounding the wheel-rim and provided at their outer edges with projecting annular flanges $c$, which are preferably hook-shaped or curved inwardly and adapted to embrace the base-flanges $b$ of the tire, as shown. One of these retaining-rings—say the left-hand ring C—is permanently secured to the face of the wheel-rim by screws $c'$ or other suitable fastenings, while the other ring, C', is detachably secured to the rim in such a manner that when released it can be withdrawn laterally from the wheel to permit the removal of the tire for repairing or renewing the same. For this purpose the detachable ring is provided at suitable intervals with attaching-lugs consisting, preferably, of blocks $c^2$, secured to the under or inner side of said ring and having slots or oblong openings $c^3$ for the passage of radial bolts D, which secure said ring to the rim. These blocks are seated in recesses $e$, formed in the side of the wheel-rim, and the faces thereof which bear against the ring C' are flush with the face of the rim. The slots of the blocks extend to their outer edges, as seen in Figs. 1 and 5, to permit the bolts D to enter the slots in applying the ring C' to the wheel-rim.

Each of the bolts D passes through a sleeve or bushing $f$, seated in an opening extending radially through the rim and provided at its inner end with a flange $f'$, which bears against the inner side of the wheel-rim. Each bolt is provided at its outer end with an oblong head $d$, which is narrow enough to pass through the slot of the corresponding block $c^2$ when turned in line therewith, but longer than the width of said slot, so as to interlock with the upper or outer side of the block when the head is turned at right angles to the slot, as best shown in Fig. 5. In order to reliably interlock the bolt-head with the block, the latter is provided in the longitudinal edges of its slot with seats or depressions $c^4$, adapted to receive the bolt-head. The nut $d'$ of the locking-bolt bears against the flanged end of the bushing $f$. When the nuts $d'$ of the various locking-bolts D are tightened, they clamp the oblong heads of the bolts in the seats $c^4$ of the blocks $c^2$, thus locking the blocks in place in the wheel-rim and securely attaching the removable ring C' of the tire-retainer to the rim and fastening the tire to the wheel. To unlock the blocks for permitting the detachment of the ring C', the clamping-nuts $d'$ of the locking-bolts are unscrewed sufficiently to permit the oblong heads of the bolts to be raised out of their seats, and the bolts are then given a quarter-turn to bring their heads into register with the slots of the blocks. The blocks are recessed or depressed on their outer sides sufficiently to leave room for the heads of the locking-bolts, as shown.

The projecting outer ends of the locking-bolts are provided with suitable means for turning them, the preferred devices consisting of a collar $d^2$, secured to the bolt and having thumb-lugs or wings $d^3$.

In addition to the locking-bolts D auxiliary fastening-bolts G are preferably employed for securing the tire in the retaining-rings C C'. However, these additional bolts are not indispensable and may be omitted, if desired. In the construction shown in the drawings the locking-bolts D are hollow, and the auxiliary bolts pass through the same and also through transverse slots or notches $h$ formed in the detachable ring C' and openings or recesses formed in the meeting edges of the tire-casing B. These auxiliary bolts are provided at their inner ends with comparatively large heads $g$, which bear against the inner side of the tire-casing, and at their outer ends with clamping-nuts $g'$, which bear against the outer ends of the locking-bolts.

In order to remove the tire from the wheel, the nuts of the auxiliary bolts G are removed or slackened and the nuts $d'$ of the locking-bolts are loosened sufficiently to permit of a quarter-turn of the last-named bolts, as hereinbefore described. The blocks being now unlocked, the detachable ring C' carrying the same can be removed laterally from the wheel-rim, thus releasing the tire and permitting the auxiliary bolts G to be withdrawn from the hollow locking-bolts. The tire is replaced by performing these acts in the reverse order.

The blocks $c^2$ in addition to forming attaching members for the detachable ring C' also serve to prevent creeping or circumferential displacement of said ring on the wheel-rim.

Although my improvement is designed more especially for use in connection with heavy tires such as are used on automobiles, the invention is equally useful for fastening bicycle-tires.

I claim as my invention—

1. The combination with a wheel-rim provided in its periphery with recesses, of a tire-retainer comprising a pair of opposing rings surrounding the rim and provided at their outer edges with flanges adapted to engage the base portion of a tire, one of said rings being detachable and provided on its inner side with lugs seated in the recesses of the rim, and means for retaining the lugs in said recesses, substantially as set forth.

2. The combination with a wheel-rim, of a tire-retainer comprising a pair of opposing rings surrounding the rim and provided at their outer edges with flanges adapted to engage the base portion of a tire, one of said rings being detachable and provided with lugs having oblong openings, and locking-bolts passing through the rim and the openings of said lugs and having oblong heads constructed to pass through said openings when turned into register therewith and to interlock with the lugs when turned out of register with said openings, substantially as set forth.

3. The combination with a wheel-rim provided in its periphery with recesses, of a tire-retainer comprising a pair of opposing rings surrounding the rim and provided at their outer edges with flanges adapted to engage the base portion of a tire, one of said rings being detachable and provided on its inner side with attaching-blocks seated in the recesses of the rim and having openings, and fastening-bolts passing through the rim and the openings of said blocks, substantially as set forth.

4. The combination with a wheel-rim, of a tire-retainer comprising a pair of opposing rings surrounding the rim and provided at their outer edges with flanges adapted to engage the base portion of a tire, one of said rings being detachable and provided with attaching-blocks having open-ended slots and locking seats or depressions, and locking-bolts passing through the rim and said slots and having oblong heads constructed to pass through the slots when turned in line therewith and to interlock with said depressions when turned at an angle to the slots, substantially as set forth.

5. The combination with a wheel-rim having radial openings and flanged bushings seated in said openings, of a tire-retainer comprising a pair of opposing rings surrounding the rim and provided at their outer edges with flanges adapted to engage the base portions of a tire, one of said rings being detachable and provided with slotted attaching-lugs, locking-bolts passing through said bushings and said slots and having oblong heads constructed to pass through the slots when turned in line therewith and to interlock with the lugs when turned at an angle to the slots, and clamping-nuts applied to said bolts and bearing against the flanged ends of said bushings, substantially as set forth.

6. The combination with a wheel-rim and a tire having base-flanges, of a retainer comprising a pair of opposing rings surrounding the rim and provided with marginal flanges which embrace said tire-flanges, one of said rings being detachable and provided with attaching-lugs having openings, hollow bolts passing through the rim and the openings of said lugs, and auxiliary bolts passing through said hollow bolts and engaging the base portion of the tire, substantially as set forth.

7. The combination with a wheel-rim and a tire having base-flanges, of a retainer comprising a pair of opposing rings surrounding the rim and provided with marginal flanges which embrace said tire-flanges, one of said rings being detachable and provided with slotted attaching-blocks, hollow locking-bolts passing through said rim and the slots of said blocks and having oblong heads constructed to pass through said slots when turned in line therewith and to interlock with the blocks when turned at an angle to the slots, and auxiliary bolts passing through the hollow locking-bolts and the inner portion of the tire and provided at their outer ends with heads which bear against the inner surface of the tire and at their inner ends with clamping-nuts which bear against the adjacent ends of the locking-bolts, substantially as set forth.

Witness my hand this 20th day of May, 1904.

EDWIN L. THOMAS.

Witnesses:
   THEO. L. POPP,
   E. M. GRAHAM.